United States Patent [19]

Hatsuno et al.

[11] 4,261,209

[45] Apr. 14, 1981

[54] FLUID PRESSURE SENSING APPARATUS

[75] Inventors: Hiroshi Hatsuno; Masaki Saito, both of Matsuyama; Mitsuo Fukushima; Shinji Ogawa, both of Sayama, all of Japan

[73] Assignee: Diesel Kiki Company, Ltd., Tokyo, Japan

[21] Appl. No.: 14,373

[22] Filed: Feb. 23, 1979

[30] Foreign Application Priority Data

Mar. 3, 1978 [JP] Japan .......................... 53-26344[U]

[51] Int. Cl.³ ........................ G01L 9/00; G01M 15/00
[52] U.S. Cl. .................................. 73/753; 73/119 A; 340/60
[58] Field of Search ................... 73/753, 119 A, 718, 73/724, 115; 340/60

[56] References Cited

U.S. PATENT DOCUMENTS

| 3,155,765 | 11/1964 | Lansch | 340/626 |
| 3,742,347 | 6/1973 | Walton | 73/718 |
| 3,868,625 | 2/1975 | Speigner | 73/115 |
| 3,948,102 | 4/1976 | Coon | 73/724 |

*Primary Examiner*—Donald O. Woodiel
*Attorney, Agent, or Firm*—David G. Alexander

[57] ABSTRACT

A sensor (16) is connected to a high pressure line (13) in a fuel injection system for an internal combustion engine. The sensor (16) produces an output current which is proportional to the pressure in the line (13). The current is converted into a corresponding voltage and a displayed a voltmeter (21). An alarm is produced when the voltage exceeds a predetermined value or range. A second voltmeter (23) is energized to display the voltage when the alarm is produced.

7 Claims, 2 Drawing Figures

FLUID PRESSURE SENSING APPARATUS

BACKGROUND OF THE INVENTION

The present invention relates to a fluid pressure sensing apparatus for sensing the pressure in a fluid passageway. The sensing apparatus is particularly useful for measuring and monitoring the pressure in a high pressure fuel injection line for an internal combustion engine.

It is desirable to measure and monitor the fuel injection pressure in an engine fuel injection system during design of the system, operation of a vehicle powered by the engine and maintenance of the system. Such measurement has heretofore been made using a Bourdon tube. However, this type of pressure gage provides an unstable indication and is extremely sensitive to temperature variations which change the reading. Although it is possible to convert the output of a Bourdon tube into an electrical signal, the electrical components required for such conversion are also sensitive to temperature variations. Such a system is also susceptible to erroneous pressure reading by marginally trained personnel.

SUMMARY OF THE INVENTION

Apparatus embodying the present invention for measuring pressure in a fluid passageway comprises a pressure sensor connected to the passageway for producing an electric current corresponding to fluid pressure, a current to voltage converter for converting an output current of the sensor to a voltage and a display for displaying said voltage.

In accordance with the present invention, a sensor is connected to a high pressure line in a fuel injection system for an internal combustion engine. The sensor produces an output current which is proportional to the pressure in the line. The current is converted into a corresponding voltage and displayed by a voltmeter. An alarm is produced when the voltage exceeds a predetermined value or range. A second voltmeter is energized to display the voltage when the alarm is produced.

It is an object of the present invention to provide a fluid pressure sensing apparatus which is highly stable and gives greatly improved measurement reading compared to the prior art.

It is another object of the present invention to provide a fluid pressure sensing apparatus which is constructed to accurately monitor fluid pressure in a fuel injection line or the like and provide an alarm and accurate pressure measurement reading when the pressure exceeds a predetermined range.

It is another object of the present invention to provide a generally improved fluid pressure sensing apparatus.

Other objects, together with the foregoing, are attained in the embodiment described in the following description and illustrated in the accompanying drawing.

DESCRIPTION OF THE PREFERRED EMBODIMENT

While the fluid pressure sensing apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
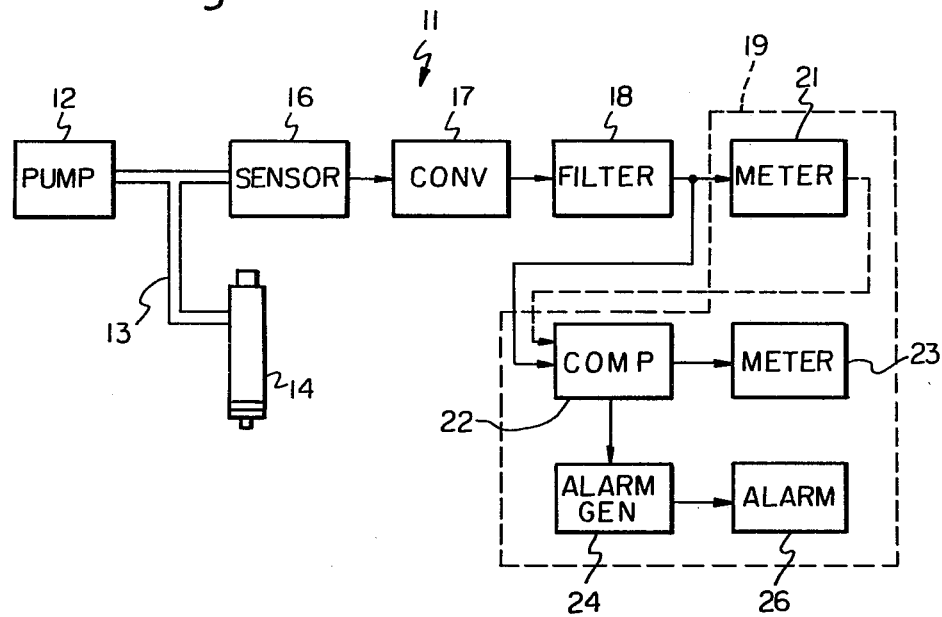
FIG. 1 is a block diagram of a fluid pressure sensing apparatus embodying the present invention.

Referring now to FIG. 1 of the drawing, a fluid pressure sensing apparatus embodying the present invention is generally designated by the reference numeral 11 and comprises a fuel pump 12. The fuel pump 12 is driven by an internal combustion engine (not shown) and supplies fuel at elevated pressure through a supply passageway or line 13 to a fuel injector 14.

The present apparatus 11 may be used in various types of fuel injection systems and other applications unrelated to internal combustion engines. In one application the pump 12 functions merely to supply fuel to the injector 14. The injector 14 in such a case comprises an engine driven piston or plunger (not shown) which injects fuel at high pressure into the engine. Alternatively, the pump 12 may comprise such a plunger and supply fuel to the injector 14 at high pressure. In such a case, the injector 14 merely comprises a spring loaded valve (not shown) which opens to allow fuel injection when the pressure supplied from the pump 12 exceeds the preload of the spring. It will thus be seen that the present apparatus is capable of measuring various ranges of fluid pressure.

In accordance with the present invention a pressure sensor 16 is connected to the line 13 to sense the magnitude of pressure therein. Preferably, the sensor comprises an electrical conductive diaphragm which is movable relative to another electrically conductive diaphragm to an extent corresponding to the fluid pressure in the line 13. The electrical capacitance between the two diaphragms varies as a function of the distance therebetween which in turn is a function of the pressure in the line 13. The sensor 16 is constructed to produce an electrical current which corresponds to, and is preferably proportional to, the pressure in the line 13. A sensor which operates on these principles and which may be utilized as the sensor 16 is manufactured by the Ohkura Electric Company, Ltd. of Japan and is designated as ALPHALINE Model 1151GP. This particular sensor produces an output current ranging from 4–20 mA in response to input pressures ranging from 0–127 mmH$_2$O. The range of diaphragm movement in this sensor is 0–0.1 mm.

The output of the sensor 16 is fed to a current to voltage converter 17 which produces an output voltage proportional to input current. This voltage corresponds to the pressure in the line 13. The output of the converter 17 is fed through a filter 18 which removes ripple and noise from the output voltage of the converter 17 to a display unit 19.

The display unit 19 comprises a display means such as an analog or digital voltmeter 21 for providing a visual display of the voltage. The meter 21 may be calibrated in units of electrical voltage or fluid pressure. The output of the filter 18 is also applied to the input of a comparator 22 which compares the input voltage with a predetermined voltage or voltage range. The comparator 22 turns on a second meter 23 when the relationship between the voltage and a reference voltage or range satisfies a predetermined criteria or relationship. Under these conditions, the comparator 22 also energizes an alarm signal generator 24 which energizes an alarm 26 such as a buzzer, flashing light, bell or siren.

The meter 21 may be provided in close proximity to the sensor 16 whereas the meter 23 and alarm 26 may be provided in a remote location such as an operation or maintenance station. The alarm 26 and meter 23 are energized only when operator or maintenance attention is required. The meter 21 provides a constant reading for on-site operations.

Figure 2:
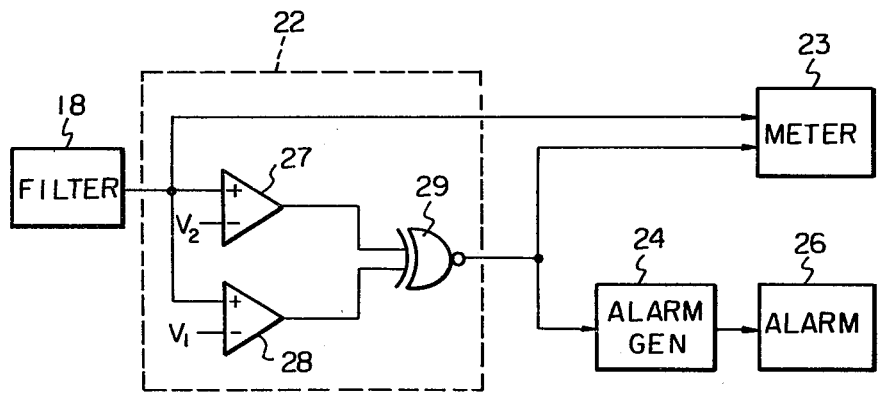
FIG. 2 is a more detailed diagram illustrating comparator means of the sensing apparatus and associated components.

The comparator 22 may energize the meter 23 and alarm 26 when the voltage applied thereto from the filter 18 is above or below a predetermined value indicating that the fuel pressure is either too high or too low. Alternatively, as illustrated in FIG. 2, the alarm 26 and meter 23 may be energized when the voltage and thereby the fluid pressure are outside of a predetermined range. In this case, the voltage from the filter 18 is either below a first predetermined voltage V1 or above a second predetermined voltage V2 which is higher than the voltage V1. The present apparatus 11 is not limited to even these criteria, however. It is further within the scope of the present invention to construct the comparator 22 in such a manner as to energize the alarm 26 and meter 23 when the voltage from the filter 18 is inside a predetermined range such as between V1 and V2. It is yet further possible to connect the output of the meter 21 to the input of the comparator 22 as indicated in phantom line, rather than the output of the filter 18.

An example of the comparator 22 is illustrated in FIG. 2. The output of the filter 18 is connected to non-inverting inputs of voltage comparators 27 and 28. The reference voltages V2 and V1 are applied to the inverting inputs of the voltage comparators 27 and 28 respectively. The outputs of the voltage comparators 27 and 28 are connected to inputs of an exclusive NOR gate 29, the output of which is connected to an input of the alarm signal generator 24 and a power switch input of the meter 23. The output of the filter 18 is applied to a signal input of the meter 23.

When the voltage from the filter 18 is below the reference voltage V1, both comparators 27 and 28 produce low outputs. This causes the exclusive NOR gate 29 to produce a high output since both inputs are the same. The high output of the exclusive NOR gate 29 causes the alarm signal generator 24 to energize the alarm 26 and also causes the meter 23 to be turned on to display the voltage from the filter 18.

When the input voltage is between V1 and V2 the comparator 28 produces a high output but the comparator 27 produces a low output. Since the inputs to the exclusive NOR gate 29 are different, the exclusive NOR gate 29 produces a low output which turns off the meter 23 and alarm 26.

When the input voltage exceeds the reference voltage V2, both comparators 27 and 28 produce high outputs. Since the inputs to the exclusive NOR gate 29 are the same, the exclusive NOR gate 29 produces a high output to turn on the meter 23 and alarm 26.

The circuit of FIG. 2 may be modified and/or simplified to operate in any desired manner. For example, the meter 23 and alarm 26 will be turned on when the light voltage is between the voltages V1 and V2 if the exclusive NOR gate 29 is replaced by an exclusive OR gate or if an inverter is connected between the exclusive NOR gate 29 and the meter 23 and alarm signal generator 24. The circuitry thus modified will not turn on the meter 23 and alarm 26 when the input voltage is below V1 or above V2.

The circuitry may be modified to turn on the meter 23 and alarm 26 when the input voltage exceeds V2 by merely omitting the comparator 28 and exclusive NOR gate 29 and connecting the output of the comparator 27 directly to the inputs of the meter 23 and alarm signal generator 24. The circuitry may be modified to turn on the meter 23 and alarm 26 when the voltage is below V1 by omitting the comparator 27 and exclusive NOR gate 29 and connecting the output of the comparator 28 directly to the inputs of the meter 23 and alarm signal generator 24. A further modification necessary to produce this latter result is to reverse the inputs of the comparator 28. The output of the filter 18 must be connected to the inverting input of the comparator 28 whereas the reference voltage V1 must be applied to the non-inverting input of the comparator 28. It is yet further possible to achieve the same result by connecting the inputs of the comparator 28 as illustrated in FIG. 2 and providing an inverter between the output of the comparator 28 and the inputs of the meter 23 and alarm signal generator 24.

In summary, it will be seen that the present invention provides a substantially improved fluid pressure sensing apparatus which produces much more accurate pressure measurements in a high pressure fluid line than has been possible in the prior art. The present apparatus is capable of not only accurately measuring the fluid pressure but monitoring the pressure and producing an automatic alarm when the pressure exceeds a predetermined range. Various modifications will become possible for those skilled in the art after receiving the teachings of the present disclosure without departing from the scope thereof.

What is claimed is:

1. An apparatus for measuring pressure in a fluid passageway, comprising:
    a pressure sensor connected to the passageway for producing an electric current corresponding to fluid pressure;
    a current to voltage converter for converting an output current of the sensor to a voltage;
    a display for displaying said voltage;
    comparator means for comparing said voltage with a reference voltage and alarm means for producing an alarm in accordance with a predetermined relationship between said voltage and reference voltage; and
    a second display for displaying said voltage when the alarm means produces the alarm.

2. An apparatus as in claim 1, in which the display comprises a voltmeter.

3. An apparatus as in claim 1, further comprising a filter connected between the converter and the display for removing ripple and noise from said voltage.

4. An apparatus as in claim 1, in which the alarm means is constructed to produce the alarm when said voltage is above the reference voltage.

5. An apparatus as in claim 1, in which the alarm means is constructed to produce the alarm when said voltage is below the reference voltage.

6. An apparatus for measuring pressure in a fluid passageway, comprising:
    a pressure sensor connected to the passageway for producing an electric current corresponding to fluid pressure;

a current to voltage converter for converting an output current of the sensor to a voltage;

a display for displaying said voltage;

comparator means and alarm means connected to the comparator means for producing an alarm when said voltage is outside of a predetermined voltage range; and a second display for displaying said voltage when the alarm means produces the alarm.

7. An apparatus for measuring pressure in a fluid passageway, comprising:

a pressure sensor connected to the passageway for producing an electric current corresponding to fluid pressure;

a current to voltage converter for converting an output current of the sensor to a voltage;

a display for displaying said voltage;

comparator means and alarm means connected to the comparator means for producing an alarm when said voltage is inside a predetermined voltage; and a second display for displaying said voltage when the alarm means produces the alarm.

* * * * *